US006463051B1

(12) United States Patent
Ford

(10) Patent No.: US 6,463,051 B1
(45) Date of Patent: Oct. 8, 2002

(54) INTERNET CALLING SYSTEM

(75) Inventor: Jeffrey T. Ford, Gilbert, AZ (US)

(73) Assignee: Inter_tel, Inc.

( * ) Notice: Subject to any disclaimer, the term of this patent is extended or adjusted under 35 U.S.C. 154(b) by 0 days.

(21) Appl. No.: 08/895,650

(22) Filed: Jul. 17, 1997

(51) Int. Cl.[7] .................. H04L 12/66; H04L 12/28; H04M 15/00

(52) U.S. Cl. ................ 370/352; 370/401; 370/466; 370/356

(58) Field of Search .................. 370/352, 353, 370/354, 355, 356, 400, 401, 402, 403, 404, 405, 406, 407, 408, 409, 465, 466, 521; 379/93.01, 93.08, 93.09, 157, 198, 220, 225, 231, 234; 709/247; 375/240

(56) References Cited

U.S. PATENT DOCUMENTS

| | | | |
|---|---|---|---|
| 5,410,754 A | | 4/1995 | Klotzbach |
| 5,453,986 A | | 9/1995 | Davis |
| 5,519,767 A | | 5/1996 | O'Horo |
| 5,528,595 A | | 6/1996 | Walsh |
| 5,608,786 A | * | 3/1997 | Gordon ................. 379/100 |
| 5,724,412 A | * | 3/1998 | Srinivasan ............ 379/93.23 |
| 5,751,706 A | | 5/1998 | Land et al. |
| 5,764,756 A | * | 6/1998 | Onweller .............. 379/242 |
| 5,892,764 A | * | 4/1999 | Riemann et al. ........ 370/401 |
| 6,011,794 A | * | 1/2000 | Mordowitz et al. ..... 370/389 |
| 6,064,653 A | * | 5/2000 | Farris ................... 370/237 |
| 6,067,350 A | * | 5/2000 | Gordon ................. 379/90.01 |
| 6,069,890 A | * | 5/2000 | White et al. ........... 370/352 |
| 6,122,255 A | * | 9/2000 | Bartholomew et al. ... 370/237 |
| 6,243,373 B1 | * | 6/2001 | Turock ................. 370/352 |

FOREIGN PATENT DOCUMENTS

WO  WO 97/28628  *  7/1997  ........... H04L/12/56

* cited by examiner

Primary Examiner—Ricky Ngo
(74) Attorney, Agent, or Firm—Snell & Wilmer LLP

(57) ABSTRACT

A system and method for placing long distance calls from a telephone through the Internet and for receiving telephone calls on a telephone from the Internet is disclosed. A phone server bridge circuit associated with a CPU includes an incoming line for receiving dual tone multi-frequency (DTMF) telephone numbers and normal voice signals. The received telephone numbers are supplied to a lookup table, which provides an Internet protocol (IP) address corresponding to the dialed number. A digital signal processor receives the Internet provider address and the normal voice signals associated with it and converts this information into Internet packets of digital data signals, including compressed voice signals. The packets of digital data signals then are supplied to a local area network, from which a router directs the Internet packets with compressed voice to the Internet provider associated with the Internet address. At the other end, the information is decompressed; and the dialed number is compared on a lookup table to provide the corresponding local called party telephone number. This telephone number and the decompressed and converted normal or analog voice information then is supplied to a PBX for routing to conventional telephones and keysets. The system therefore functions to permit long distance telephone calls to be placed through the Internet via local telephone lines.

3 Claims, 2 Drawing Sheets

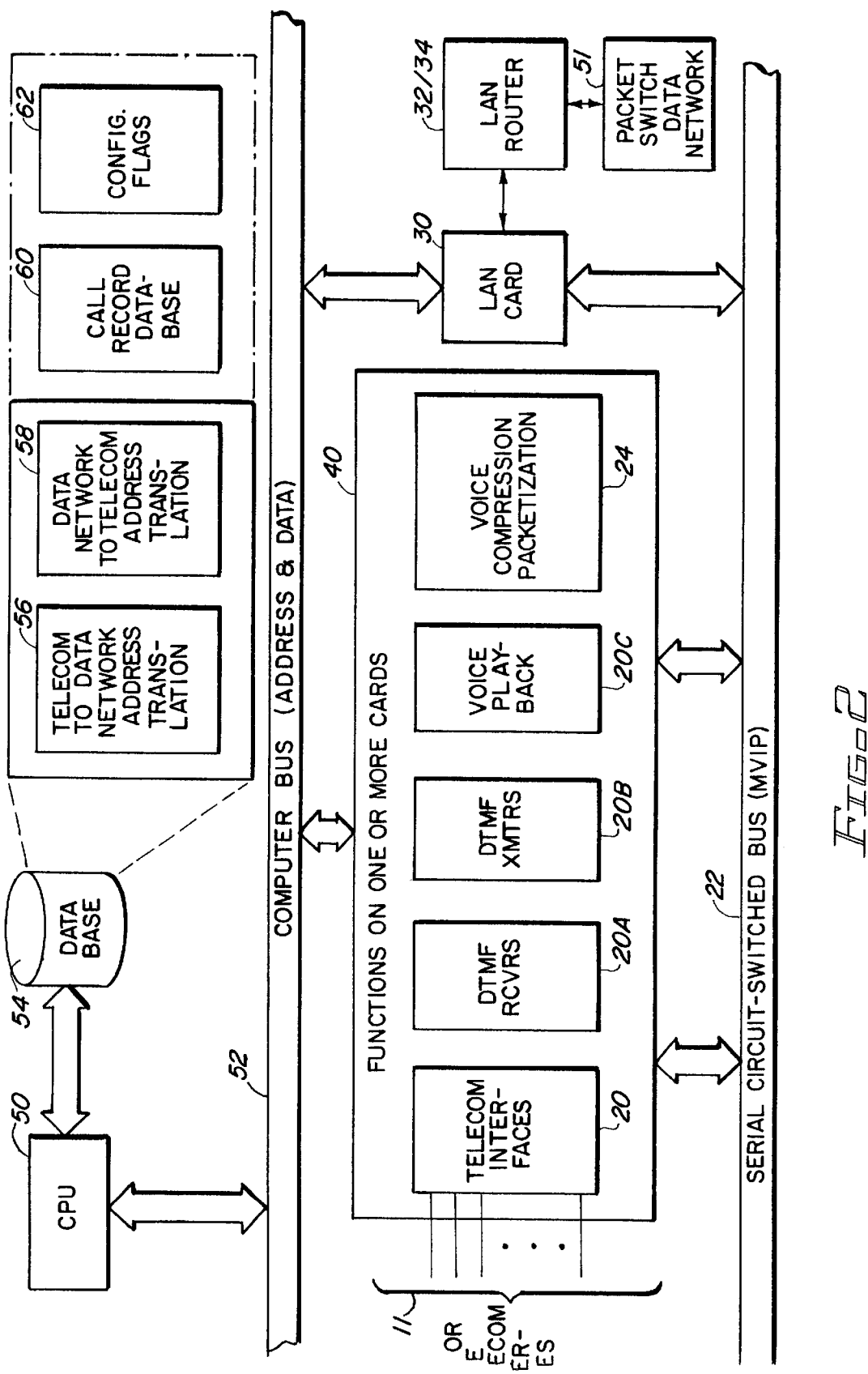

INTERNET CALLING SYSTEM

BACKGROUND

Typically, long distance telephone links for either voice or digital transmission, such as facsimile and the like, are provided by regulated long distance carriers for interstate and international calls, as well as many intrastate calls. The rates which are charged for calls placed over conventional long distance carriers are significantly higher than rates charged for local telephone calls. In fact, most local telephone calls are not subject to any additional tariffs, beyond a fixed monthly charge for the telephone line interconnection with a customer or user.

For some individuals and for many companies, particularly large companies with multiple locations throughout the United States and the rest of the world, monthly long distance telephone charges can be very significant. For large companies, these charges are in the thousands of dollars. Various sophisticated call routing systems have been developed to obtain least cost routing (LCR) for calls from one location to another through corporate PBX's; but even when such systems are employed, significant monthly long distance telephone costs are incurred.

Digital message links between computers located anywhere in the world are established with communications links on the Internet. Various Internet providers supply message services for distributing "E-mail" between subscribers on the Internet. Individual subscribers have specific addresses supplied by their respective Internet providers; and host computers receive and distribute E-mail messages from computer "mailboxes".

Other uses of the Internet are the establishment of direct on-line links between computers located throughout the world. Typed or written communications then may be effected by the various parties who are linked by their common selection of a particular computer "chat room".

All of the Internet communications which have been-discussed above are effected from the various computers involved by way of the placement of a local call on the public voice-grade telephone system. No long distance calls are necessary, even though communications are effected with computer users throughout the United States and throughout the world.

A mechanism for resource sharing among computer users, such as a plurality of computer work stations, file servers, facsimile servers, modem servers, printer servers and the like, is effected by links known as local area networks (LAN). Two or more local area networks may communicate with one another over a voice-grade telephone system by transmitting data in a form suitable for transmission over the telephone system. LAN systems are well known and are widely used for interconnecting multiple users with one another for corresponding over the Internet. This typically is effected through an interface between the LAN and the wire carrier system, typically a dial up connection being established between a host utilizing a T-1 wire line carrier connected to a telephone company central office and a remote host. This is accomplished by connecting the host to the LAN terminal server, which de-multiplexes the LAN communication inputs to communication lines which drive a dial-up modem for communications over a voice grade telephone line. The information then is transmitted over the T-1, T-2 or T-3 voice grade telephone line.

A system for connecting a public voice grade telephone system to a local area network (LAN) of the type described here is disclosed in the U.S. patent to Klotzback U.S. Pat. No. 5,410,754. The U.S. patent to O'Horo U.S. Pat. No. 5,519,767 discloses a voice and data modem used in a call waiting system. Even though voice and data information is employed in the system of this patent, no Internet or LAN links are disclosed.

The U.S. patent Walsh U.S. Pat. No. 5,528,595 discloses a modem input/output signal processing system which enables bilateral digital transmission between a telephone and a LAN. The system operates to modulate signals responsive to signals from a LAN representing an outgoing call to form digital telephone signals suitable for transmission by a telephone line, and suitable for demodulation by receiving analog modems. No provision for linking telephones over the Internet is provided by this system, however.

The U.S. patent to Davis U.S. Pat. No. 5,453,986 discloses a dual interface communications system, which allows switching from data to voice over data communications. The system operates in a voice over data communications mode, simultaneously, to send compressed voice and data.

Many companies have realized that quality Internet telephony communication is possible. To capitalize on the opportunity this presents, desktop software which offers computer-to-computer communication is flourishing. Internet telephony products are presently available which provide real time voice communications over the Internet using computers at each end. A problem with currently available products, however, is that all of these products are limited by the fact that they each require each individual user to have a computer with some type of Internet connection, and to have the same Internet telephony software. Such systems do not allow users to make calls using standard telephones.

In view of the technology presently available, it is desirable to provide a system which is capable of linking conventional voice grade telephones and key sets at one location, through a local area network (LAN), and through the Internet, to a telephone or key set at a remote (long distance) location.

SUMMARY OF THE INVENTION

It is an object of this invention to provide an improved long distance telephone system and method.

It is another object of this invention to provide an improved Internet long distance system and method.

It is an additional object of this invention to provide an improved phone server link using the Internet between telephones and key sets.

It is a further object of this invention to provide an improved long distance phone server system and method for effecting long distance telephone links between telephone users, by way of an Internet link.

In accordance with a preferred embodiment of the invention, an Internet phone server bridge system is coupled with a telephone system, which routes predetermined long distance calls to the bridge system. The telephone numbers for the called party are converted by the phone server bridge into a corresponding Internet provider address for that party. The Internet provider address signals and the following digital data signals for compressed voice are converted to packages of digital data signals, which then are supplied over the Internet to a local area network and, from there, are routed through a bridge system to the called party telephone. At the receiving end, the IP address signals and the following digital data signals for the compressed voice are decompressed and converted to normal telephone voice grade signals. The address also is converted to a local phone number, supplied through a PBX or the like to the called party telephone. The conversation between the calling party and the called party takes place in a conventional manner; and the data link and signal conversions are transparent to the users.

BRIEF DESCRIPTION OF THE DRAWINGS

FIG. 2 is a more detailed block diagram of a portion of the embodiment shown in FIG. 1.

DETAILED DESCRIPTION

Figure 1:
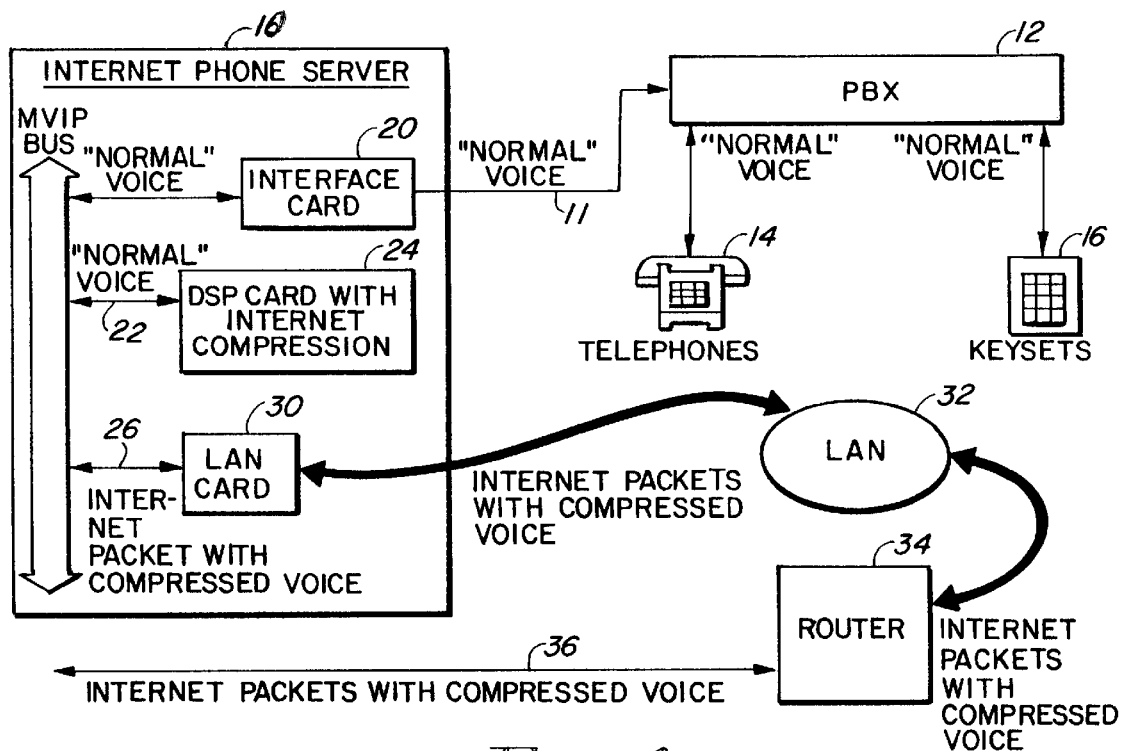
FIG. 1 is a block diagram of a preferred embodiment of the invention.

Reference now should be made to the drawings, in which the same reference numbers are used in different figures to designate the same components. FIG. 1 shows a preferred embodiment of the invention for permitting Internet telephony through standard telephones. As illustrated in FIG. 1, telephone communications may be initiated and received by utilization of an Internet phone service system coupled by way of a standard voice-grade telephone T1 trunk line 11 or analog trunk line 11 to a private branch exchange (PBX) switch 12. Typical PBX switches connect twenty or more station sets to one another, a public network, and various private networks. Systems with fewer than twenty stations generally are referred to as key systems. The term "PBX" used here is intended to include key systems, as well as what are normally thought of as PBX systems. Key sets 16 for transmitting either data or analog voice signals and telephones 14 are connected through the PBX 12 in a conventional manner. As is well known, a PBX 12 functions to route the calls which are initiated by either the telephone 14 or a key set 16, in accordance with the PBX protocol, over various outgoing trunks or lines. Various PBX systems 12 and key systems currently include features to automatically choose the least expensive way of making or routing the call that is presented by the telephone 14 or key set 16. Such a least expensive way may be a tie line, or a WATS line, or the Internet, or an intra-net by way of a phone service system. This selection of the call routing is automatic route selection (ARS), and is similar to a known technique for least cost routing (LCR) which has been employed by PBXs 12 (including key systems) in the past.

For the present system, the ARS selection by the PBX 12 is implemented in response to the dialed digits of the outgoing calls from the telephones 14 and key sets 16, and is not dependent upon the time of day, nor the day of the week. To accomplish this routing to utilize the Internet as a substitution for the public switched telephone network (PSTN), it is necessary for the user to program the PBX 12 first. Typically, this programming or routing is based on a combination of long distance area codes and/or office codes for a company system having offices in scattered locations throughout the country or throughout the world. The manner in which this routing is effected, however, is the same as least-cost-routing (LCR) techniques which have been used in the past to select different trunks for outgoing lines, in accordance with the pre-programmed information.

In the present case, the PBX 12 may be used to route some or all long distance calls in the manner described above, over an Internet gateway line or trunk 11 to a phone server bridge system 10 shown in FIG. 1. It should be noted that in order to place a call, the caller dials the number of the party being called on a standard telephone 14 or key set 16, the same as if making a call through the PSTN. The user of the telephone 14 or key set 16 is not aware of any difference over the standard manner of placing such calls. The call then is routed through the phone server bridge system 10 or gateway 10, which processes the call internally through an interface card 20 and an internal multi-vendor integration protocol (MVIP) bus 22 internal to the system 10. MVIP buses are used in computer telephony integration and such a bus operates in a conventional manner in the system shown in FIG. 1.

Normal voice or analog signal information from the telephone 14 or key set 16 applied over the T-1 trunk 11 from the PBX 12 to the server 10 is then transferred from the MVIP bus 22 to a digital signal processor (DSP) card 24, which performs complex filtering of the analog or normal voice signals supplied to it and signal manipulation to produce digital packets of the voice or analog information supplied to it. It also should be noted that the DSP card 24 also operates in the reverse manner to receive digitized packets of compressed voice information over the MVIP bus 22, and process this information into normal voice signals applied over the MVIP bus 22 and back to the interface card 20, as normal voice or analog telephone signals over the trunk 11 to the PBX 12 for return full duplex communications with the telephone 14 when a connection to a remote telephone is made.

For the present time, however, consider the connections being made on an outgoing basis prior to the resumption of a conversation over the telephone 14 or communication with the key set 16. The packets of digitized compressed voice data supplied over the internal bus 26 are applied through a local area network (LAN) card 30, and from the card 30 through a LAN 32 to a router 34, which then routes the Internet addressed information to the appropriate Internet link 36. The information flowing from the DSP card 24 to the LAN card 30, the LAN 32 and router 34 comprises Internet packets with compressed voice for transmission over the Internet WAN (wide area network).

Reference should be made to FIG. 2, which illustrates additional details of the manner in which calls are routed and grouped by the system shown in FIG. 1. As mentioned previously, calls are routed through an existing phone system consisting of the PBX 12 and telephones 14 and 16, through a T-1 trunk line 11 or analog trunk line 11, to the phone server bridge 10. A number of such lines 11 may be connected to the server 10. Typically a single server 10 is capable of supporting up to 24 simultaneous calls on incoming lines 11, which are illustrated in FIG. 2 at the lower left-hand corner as inputs to the system.

As noted above in conjunction with FIG. 1, the lines 11 are coupled to an interface card or block 20, which functions to process voice signals and operates in conjunction with the DSP card 24 to produce digital packets of compressed data in a high level data link control (HDLC) or real time protocol (RTP) frame format. HDLC is a bit-oriented link layer protocol defined by the ISO for use over serial data links. It includes a definition of a variable length frame format, as well as elements of procedure for functions, such as link establishment, sequencing, flow control and error recovery. As is well known, the HDLC frame format defines the use of flag characters as delimiters of the data frame, along with frame check sequence bytes and a byte control field immediately following the opening flag.

RTP (Real-time Transport Protocol) provides end-to-end delivery services for data with real-time characteristics, such as interactive audio and video. Those services include payload type identification, sequence numbering, timestamping and delivery monitoring. Applications typically run RTP on top of VDP to make use of its multiplexing and checksum services; both protocols contribute parts of the transport protocol functionality. However, RTP may be used with other suitable underlying network or transport protocols. RTP supports data transfer to multiple destinations using multicase distribution if provided by the underlying network.

Prior to creating these packets of information, however, the incoming information in the form of a "called party" telephone number is supplied from a DTMF receiver card 20A, which in turn is part of a larger processing system 40, to an internal computer bus 52 coupled with a conventional computer, such as a PC, shown as a CPU 50 in FIG. 2. The CPU 50 includes a memory lookup table data base 54, illustrated in FIG. 2 as including a telecommunication to data network address translation memory section 56 and a data network to telecommunication address translation memory section 58 of dialing pattern entries. Optional features coupled with the data base 54 include a call record data base 60 and configuration flags 62.

When a telephone number, however, is processed through the interface section 20 and the CPU 50 to the data base 54, a determination is made as to the address "match" of that called number via the telecom-to-data network address lookup table translation memory section 56 to translate the address of the called number to one which effectively may be routed over the Internet line 36 shown in FIG. 1. This translated address and the received telephone number then are supplied to the data router card 32/34 illustrated in FIG. 2. This initial dialed information is supplied over the Internet connection or link 36 to the Internet packet switch data network 51.

At the called party end, the signals, after processing into Internet data packets supplied over a lead 36 through a router 34, are addressed to the LAN 32 associated with the called party location. The LAN 32 then supplies these signals to the LAN card 30 of the called party phone server 10 shown in FIG. 1. The called party telephone number signals are supplied to the computer bus 52 for translation by the Data Network to telecom address translation lookup table 58. The translated signals then are supplied to the DTMF transmitter 20B and supplied through the MVIP bus 22 and the interface card 20 over the T-1 or analog line 11 to the PBX 12. These calls received by the PBX 12 then are routed by the PBX 12, either directly to telephones or key sets 14 and 16 associated directly with the PBX, or, if the number being called is not associated directly with some internal telephone 14 or key set 16, the call is routed through the PBX 12 over the local telephone network to the telephone being called.

Once the called party goes "off hook" in a conventional manner, the digitized packets of compressed voice signals are supplied back over the line 36 through the router 34, the LAN 32, to the LAN card 30 in the server 10. The voice compression packetized signals then are decompressed by the DSP card 24 (FIGS. 1 and 2). The decompressed normal voice signals are routed to the MVIP bus 22, and from there through the interface card 20 back onto the T-1 line 11 or analog trunk 11. From the line 11, the return message is processed through the PBX 12 to the one of the telephones 14 or key sets 16 which initiated the call. Full duplex signaling is effected by the system. Preferably, this is accomplished by pulse code modulation (PCM) operation of a conventional type used to permit full duplex operation. Modulation and demodulation for effecting the full duplex communications is effected in a conventional manner.

It should be noted that the system which has been shown and described in conjunction with FIGS. 1 and 2 is not limited to calls between telephones directly associated with a PBX 12. Calls also can be routed through the trunk lines of a remote PBX. This allows a caller in one city to place a call over the Internet to a distant city, thereby avoiding long distance phone charges. To place a call, the caller dials a telephone number which is converted via Table 56 to an IP address of an Internet server, such as the server 10 shown in FIG. 1, in the destination city, following the same steps described above in conjunction with FIGS. 1 and 2. When the call arrives at the PBX 12 in the destination city, the PBX 12 transfers the call to an outbound trunk and dials the caller's desired local number. Since the call to the local number is being made from a PBX 12 in the destination city, the call is a local call; and no long distance charges accrue. It also should be noted that users of the system shown in FIGS. 1 and 2 are able to access the features of their existing phone system while on an Internet call. For example, users can transfer calls, make conference calls, and use peripheral products such as a PC phone or an operator's console. Anything which can be done with their regular telephone calls can be accomplished using the phone server bridge system 10 described above.

It is apparent that the system shown in FIGS. 1 and 2 implements a bridge between the telephone network and a TCP/IP (transmission control protocol/Internet protocol) network or an intra-net. The server system 10 interfaces to a telephone network using a T-1 trunk line, such as 11, employing E and M (ear and mouth) signaling or an analog trunk line 11. It interfaces to an Ethernet LAN via the :LAN card 30; and the LAN then may be connected to the Internet or an intra-net via the router 34 or some similar equipment. The combination of the local LAN, the router 34, and the Internet or intra-net may be considered as an LAN/WAN interface.

As explained above, the server system 10 may receive calls either from the T-1 trunk 11 (or analog trunk line 11) or from the LAN/WAN interface via the router 34 and the LAN 32. The number of simultaneous calls which may take place through any server system 10 is limited by the number of T-1 trunk ports or lines 11 in the server 10. The system does not require any changes to existing PBXs to route calls to the servers 10 over the Internet. The system works with any PBX which has the ability to route calls to specific trunks (or trunk groups) based on the phone number dialed, via the above identified ARS or LCR features.

The effectiveness of the system relies upon speech compression and digitized packeting of the compressed voice or speech signals, as described above in conjunction with the operation of the DSP card 24. Various types of standard speech compression techniques may be employed. As is well known, the greater the compression the lower the bit rate, but the poorer the speech quality. A speech compression standard known as GSM (Global System Mobile) already is a prominent standard used in Europe for cellular phones; and, consequently, it is in widespread use. Such GSM speech compression is a preferred technique for the system described above, since it constitutes a good compromise between cost, speech quality, processing power, and speech delay.

Using a speech compression technique such as GSM does produce short inherent delays, which by themselves are not noticeable to the average telephone user. Other delays, however, are generated by the system. The most significant source of delay is in the LAN/WAN itself. The sources of delays which occur in the LAN/WAN network comprise the speed of transmission, delay caused by the routers, delay caused by the route taken, and delay caused by traffic on the LAN/WAN. Since these delays added to those already inherent with the GSM speech compression can be sufficiently long to be noticeable, systems of the type shown in FIGS. 1 and 2 typically include buffers which may be referred to as "jitter buffers". Such buffer circuits are not shown in conjunction with the circuits of FIGS. 1 and 2; but it should be noted that they may be employed along with standard echo cancelers to remove reflections or echos. Such echo cancelling capabilities typically are implemented using the technology in the DSP card, which compresses and decompresses the signals.

In order to understand the operation of the system which has been described above, the operation will be described in conjunction with a specific example. Assume that a customer wants to make a long distance call from a telephone 14 using the Internet. Also assume that there are three sites involved: Phoenix, Houston and St. Louis. The customer at the telephone 14 of FIG. 1 wants all calls from Phoenix to the Houston or St. Louis areas (and vice-versa) to be made via the Internet. To accomplish this, a phone server bridge system 10 is installed at each of the three sites.

The example now will be considered to cover the set-up at the Phoenix site; but the programming at the other two sites is done the same way. At the Phoenix site, the user programs the Phoenix PBX 12 to route all calls to the St. Louis and Houston area codes to the T-1 trunk 11 connected to the server system 10. This is accomplished by using automatic route selection (ARS) or least cost routing (LCR), already available in the PBX. This is all that needs to be done at the PBX; and this is a technique which requires no modification whatsoever of the PBX 12. The server 10 at the Phoenix location has routing tables in the data base 54/56 defined to route calls to the St. Louis area code to the IP (Internet protocol) address of the respective St. Louis and Houston phone server systems 10 at those locations. This is the programming which is required at the Phoenix location on the phone server 10 for outgoing calls from the Phoenix PBX 12 through the Phoenix phone server 10.

To handle incoming calls from St. Louis and Houston, the Phoenix phone server 10 is then programmed, via the data base 54/58 of FIG. 2, to route telephone numbers for Phoenix site extensions in the form of the telephones 14 and 16 connected to the PBX 12 to the individual extension numbers. For any other Phoenix area telephone numbers which are called from the St. Louis and Houston locations, the server 10 is programmed via the memory lookup tables 58 to route these calls out on another trunk (not the T-1 trunk 11) on the PBX to the appropriate local telephone number. Following Table 1 illustrates the manner in which a number dialed by the PBX from the Phoenix location is handled to make a call to the St. Louis area or Houston area through the phone server 10:

TABLE 1

OUTGOING LOOKUP TABLE

| | Dialing Pattern | IP-address |
|---|---|---|
| St. Louis area | 1-314-XXX-XXXX | 444.444.444.444 |
| Houston area | 1-713-XXX-XXXX | 555.555.555.555 |
| | 1-281-XXX-XXXX | 555.555.555.555 |

The phone server 10, as is apparent from an examination of the above Outgoing Lookup Table, receives a ten-digit long distance telephone number dialed from the PBX 12 and matches this against the dialing pattern entries in the lookup table in the data base 54/56. Also as is apparent from Table 1, the preferred method of matching includes a character string match using variable length dialing patterns. In other words, "wildcard" or "don't care" digits (as denoted by the "Xs" in the Dialing Pattern column of Table 1) are used to speed up the matching process. As is often the case in character string matching, the entire number (character string) or at least a substantial portion of the number is used to match a stored dialing pattern. This process helps to eliminate performing multiple searches and matches on parsed-out portions of the number. In addition, because of the wildcard characters, a complete match is not required. When a suitable match is found, the corresponding IP address is used to make the call over the Internet, via the router 34 and connection 36. The initial set-up message includes a field with the original digits received from the PBX 12 (to be used to route the call again by the phone server 10 on the other side of the connection, that is the phone server 10 at St. Louis or Houston).

The following table describes the manner in which set-up messages from the Internet are handled in the system:

TABLE 2

INCOMING TABLE

| | Dialed number | Local Dialed Number |
|---|---|---|
| Ringo Starr, x1245 | 1-602-940-2179 | 1245 |
| George Harrison, x1253 | 1-602-940-2180 | 1253 |
| Paul McCartney, x1221 | 1-602-940-2181 | 1221 |
| Local Calls | 1-602-XXX-XXXX | 8,XXX-XXXX |

One of the fields in the set-up message is the destination telephone number of the call. The phone server 10 takes this field and matches it against the dialed number entry in the lookup table 54/58. Whenever the server 10 finds such a match in the portion 58 of the data base 54 shown in FIG. 2, the phone server 10 "rings" the PBX via a T-1 port, such as the trunk 11. When the PBX 12 answers, it signals it is prepared to receive digits using a "wink" or a dial tone back to the phone server 10, which then dials the local dial number, which the PBX 12 then uses to route the call (via a call routing table in the PBX) to the appropriate extension number. As noted in the above incoming table, the first three entries correspond to people located at the local site of the PBX 12. These people are connected by means of telephones 14 or 16 at that site to the PBX 12. Because these are local calls, they are called by their extensions as opposed to making a local call through the public telephone network. The fourth entry in the above Incoming Table 2 handles the rest of the calls to the Phoenix area. These calls are handled by dialing an outgoing access code (8) followed by the local telephone number, by way of the PBX 12 interconnecting with the local public telephone network.

It should be noted that in the above examples, ten digit telephone numbers are used. This is not required by the phone server 10, however, nor is it required that calls are routed to different phone servers 10 using the area code. This is but one of the ways in which the system may operate; and it is described to make an understanding of the system operation simpler. The dialing patterns handled through the phone server circuit 10 (as expanded in FIG. 2) effectively can handle any number of digits; so that the telephone numbers may not really exist on the telephone network, so long as the data base 54/56/58 is configured to properly recognize the numbers and provide the routing based on the patterns.

In a worst case example, the lookup table interfaced with the CPU 50 via the data base 54/56/58 could contain a number of individual phone numbers, one for each possible destination (each internal extension, or each local telephone number the system can call). Obviously, using generic patterns can make programming much simpler as long as the numbering plan makes this possible. For example, unique numbers may be made up specifically for people commonly associated with the system. As far as the phone servers 10 are concerned, such people with internal extensions are identified by using the Phoenix area code with an office code of "000" followed by that person's extension number. This then can be handled by the routing table to dial the local extension much in the same manner as the first three numbers on the incoming lookup table described above.

Figure 3:
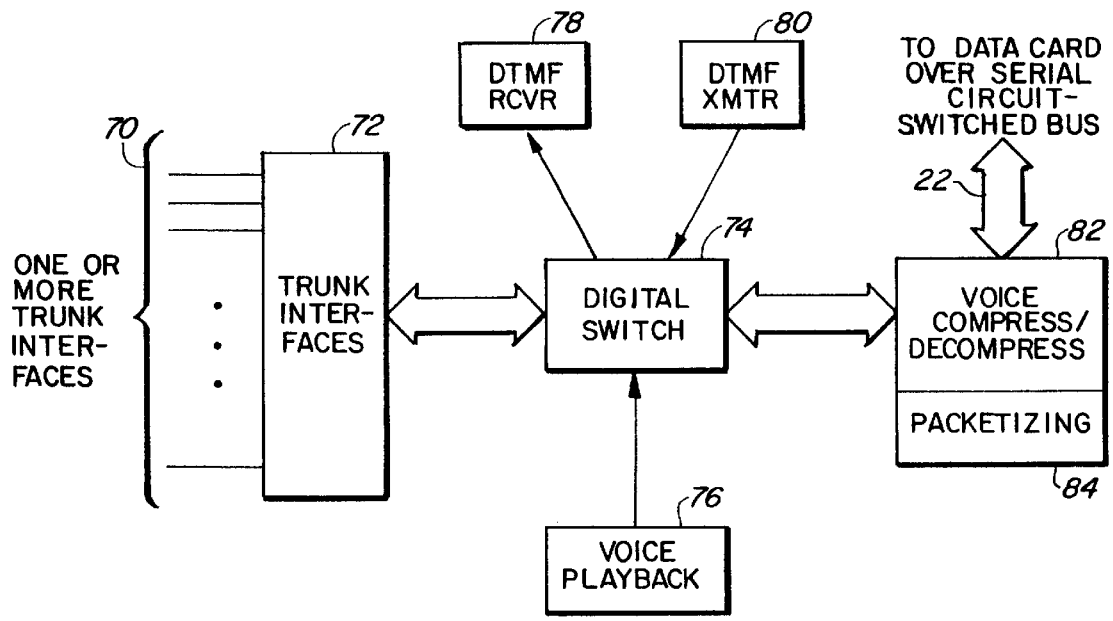
FIG. 3 is a block diagram of an extension of the embodiment shown in FIG. 1.

FIG. 3 is a block diagram of another embodiment of the invention, which does not utilize a PBX 12 of the type described above in conjunction with FIG. 1. In the system of FIG. 3, a phone server 10 (FIG. 1) is dialed by its telephone number via a trunk line 70 coupled through a trunk interface 72 communicating with a digital switch 74. The digital switch 74 has a DTMF receiver 78 and a DTMF transmitter 80, along with a voice playback circuit 76 (if this feature is desired). Signals from the digital switch 74 then are supplied via the Internet to the phone server 10 through a DSP card 82, 84 for effecting voice compression/decompression and packetizing. The card 82, 84 is coupled with the MVIP bus 22 in the phone server 10. Signals from the output of the phone server 10 are applied over appropriate trunks in the manner described above when a PBX 12 is not utilized.

The system of FIG. 3 is particularly useful in conjunction with prepaid telephone cards. The phone server 10 may include accounting timers in the CPU system 50 for establishing the time/cost deduction for prepaid cards used with the system. The phone server 10 also may include a call record data base 60 (shown in FIG. 2) for use in retrospective call accounting reports. Additional variations of the system which may be employed include the configuration of a voice mail message when no answer is received by the destination telephone. Apparatus may be employed to reconfigure such voice mail messages as E-mail messages for the recipient, who then can access the information via a personal computer in the manner of retrieving normal E-mail messages.

The foregoing description of the preferred embodiment of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A method for placing a long distance telephone call on an Internet from a telephone including the steps of:

providing a telephone/Internet bridge system;

routing a predetermined conventionally dialed long distance number from a telephone to said bridge system;

character string matching said conventionally dialed long distance number, wherein said number includes at least one wildcard digit, to a corresponding Internet (IP) address by comparing said number with a plurality of dialing pattern entries to establish a match, said match comprising either a direct match or a partial match and said partial match established with a generic pattern;

automatically converting signals for said conventionally dialed long distance number to said corresponding Internet (IP) address;

converting said IP address to packets of digital data signals in said bridge system; and routing said packets of digital data signals to an Internet connection to establish full duplex communication.

2. The method according to claim 1 further including the step of converting voice signals from said telephone to packets of digital data signals in the form of compressed voice digital data signals.

3. A system for routing a long distance telephone call between a telephone and an Internet via a local area network (LAN) including in combination:

a phone server system having a trunk input for receiving a conventionally dialed long distance phone number and an analog voice signal from said telephone;

a processing unit within said phone server system comprising a lookup table having a plurality of variable length dialing patterns for character string matching said received phone number, wherein said number includes at least one wildcard digit, and a translation component to automatically convert said phone number to an Internet protocol address corresponding to a matched pattern;

a digital signal processor coupled to receive said analog voice signal for converting said analog voice signal to compressed packets of digital data signals;

a local area network circuit coupled to said digital signal processor for supplying said packets of digital data signals to a local area network (LAN); and a router responsive to said Internet protocol address and coupled to said LAN for routing said packets of digital data signals to an Internet transmission link.

* * * * *